United States Patent
Mullen, Jr.

(10) Patent No.: US 6,311,935 B1
(45) Date of Patent: Nov. 6, 2001

(54) CABLE CLAMP

(75) Inventor: Thomas M. Mullen, Jr., Dunellen, NJ (US)

(73) Assignee: Heyco Products, Inc., Toms River, NJ (US)

( * ) Notice: Subject to any disclaimer, the term of this patent is extended or adjusted under 35 U.S.C. 154(b) by 0 days.

(21) Appl. No.: 09/548,834

(22) Filed: Apr. 13, 2000

Related U.S. Application Data
(60) Provisional application No. 60/142,590, filed on Jul. 7, 1999.

(51) Int. Cl.[7] .................................................. F16L 3/08
(52) U.S. Cl. .................. 248/74.1; 24/16 PB; 248/74.2
(58) Field of Search ................... 248/74.1, 74.2, 248/68.1, 62, 69, 60, 49, 56, 74.3; 24/16 PB

(56) References Cited

U.S. PATENT DOCUMENTS

| | | |
|---|---|---|
| 682,847 | 9/1901 | Forsyth . |
| 2,310,622 | 2/1943 | Ellinwood . |
| 3,144,695 | 8/1964 | Budwig . |
| 3,376,004 | 4/1968 | Goldman . |
| 3,719,971 | 3/1973 | Lodi . |
| 4,264,047 | 4/1981 | Nelson . |
| 4,478,381 | 10/1984 | Pittion et al. . |
| 4,775,121 | * 10/1988 | Carty ................................. 248/68.1 |
| 5,113,717 | 5/1992 | Plamper . |
| 5,390,876 | * 2/1995 | Hatano et al. ....................... 248/73 |
| 5,494,245 | * 2/1996 | Suzuki et al. ..................... 248/74.1 |
| 5,653,411 | * 8/1997 | Picco et al. ...................... 248/74.1 |
| 5,820,048 | 10/1998 | Shereyk et al. . |
| 5,906,342 | * 5/1999 | Kraus ............................... 248/74.1 |
| 6,142,429 | * 11/2000 | Ahroni ............................. 248/74.2 |
| 6,164,604 | * 12/2000 | Cirino et al. ..................... 248/74.3 |

* cited by examiner

Primary Examiner—Leslie A. Braun
Assistant Examiner—Tan Le
(74) Attorney, Agent, or Firm—Selitto, Behr & Kim

(57) ABSTRACT

A clamp for holding elongated objects having a generally U-shaped trough for receiving the object to be held and a pair of substantially flat tabs extending from opposite sides of the trough proximate to an upper end of each side thereof. At least one of the pair of tabs preferably has a hinge to render it bendable to bridge over the trough and underlay the other of the pair of tabs in substantially parallel relationship thereto, closing said U-shape to form a D-shape. Tab alignment structures are provided for establishing and maintaining the position of the one tab relative to the other when the one tab underlays the other. In a first embodiment, a ring on one tab is received in a mating receptacle in the other. In a second embodiment, a pin projects from a surface of one tab and extends through an opening provided in the other. The pin is received and retained in an opening in the mounting surface.

16 Claims, 6 Drawing Sheets

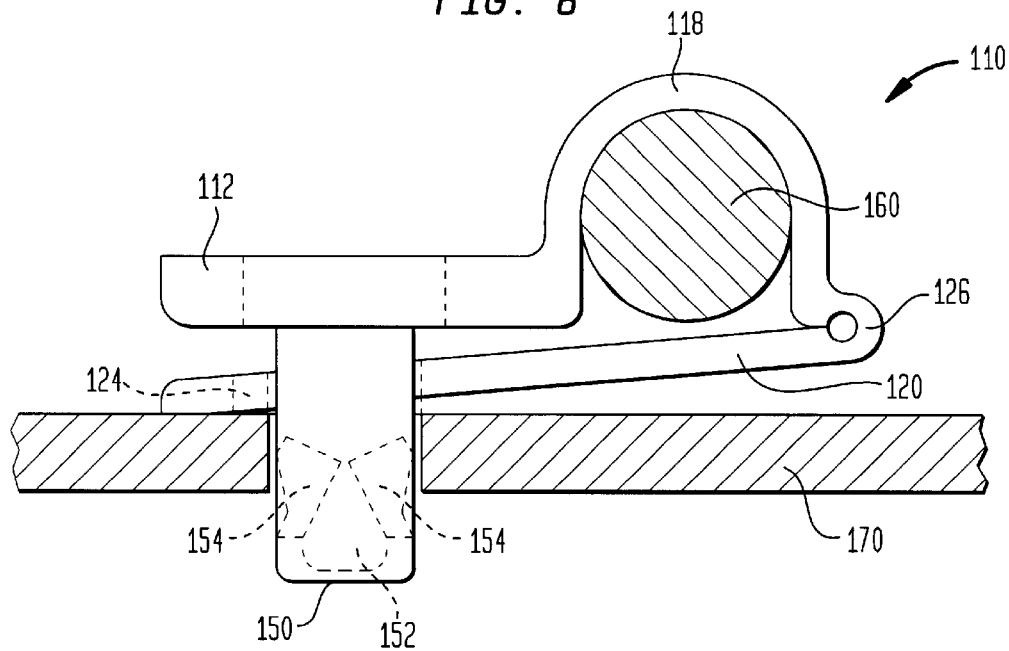
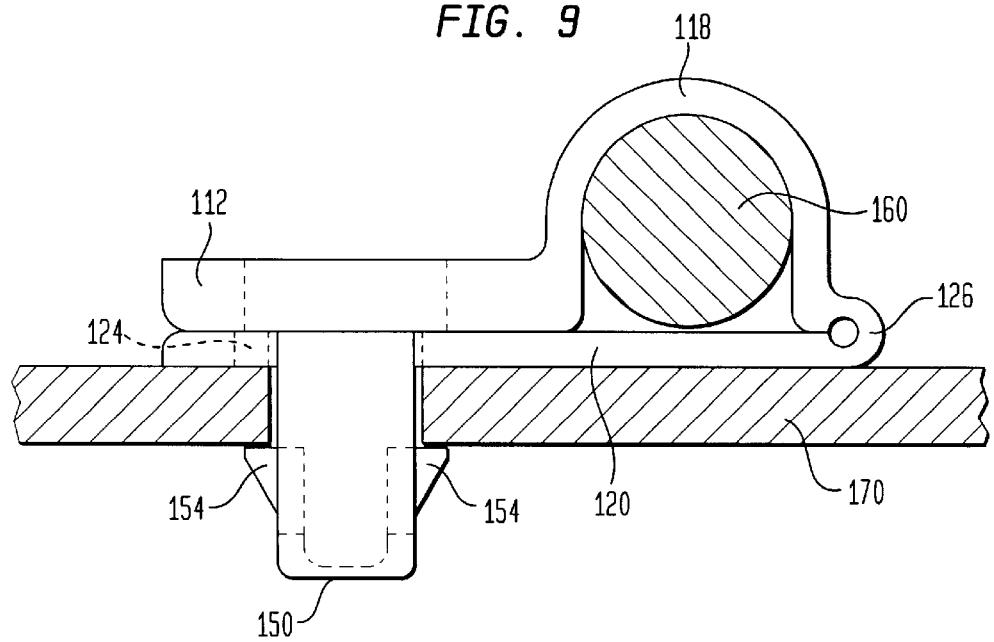

CABLE CLAMP

Cross Reference to Related Application

This is a §111(a) application relating to U.S. appln. Ser. No. 60/142,590 filed Jul. 7, 1999.

FIELD OF THE INVENTION

The present invention relates to a cable clamp, and, more particularly to a self-locking cable clamp having a living hinge.

BACKGROUND OF THE INVENTION

Cable clamps of various types exist today. Generally, a cable clamp has a loop to hold cable therein and a hole which is sized and shaped to receive a fastener, such as a screw, to mount the cable clamp onto a support surface. A cable clamp is usually made from a resilient material, such as plastic, so that it retains some flexibility and has good durability.

Some existing cable clamps, for example the clamp disclosed in U.S. Pat. No. 3,376,004 to Goldman, employ a self-locking mechanism to keep the loop in the clamp closed. However, clamps of this type have the disadvantage that when the clamp is mounted onto a support surface, the lateral forces created by the tightening of the fastener can cause the locking mechanism to open, thereby releasing the clamp from the cable when the fastener is removed. There is therefore a need for a cable clamp that is not susceptible to such lateral forces, and which will remain locked while being mounted onto a support surface.

SUMMARY OF THE INVENTION

The problems and disadvantages associated with conventional apparatus for clamping objects are overcome by the present invention which includes a clamp for holding elongated objects proximate to a mounting surface. The clamp has a trough for receiving the object to be held and a pair of substantially flat tabs extending from opposite sides of the trough proximate to an upper end of each side thereof. At least one of the pair of tabs are bendable to bridge over the trough and underlay the other of the pair of tabs in substantially parallel relationship thereto, closing the trough. Tab alignment structures are provided for establishing and maintaining the position of the one tab relative to the other when the one tab underlays the other.

BRIEF DESCRIPTION OF THE DRAWINGS

For a better understanding of the present invention, reference is made to the following detailed description of two exemplary embodiments considered in conjunction with the accompanying drawings, in which:

FIG. 8 is a cross-sectional view of the cable clamp shown in FIG. 6 partially installed onto a support surface; and FIG. 9 is a cross-sectional view of the cable clamp shown in FIG. 6 in its closed position and fully installed onto a support surface.

DETAILED DESCRIPTION OF THE DRAWINGS

Figure 1:
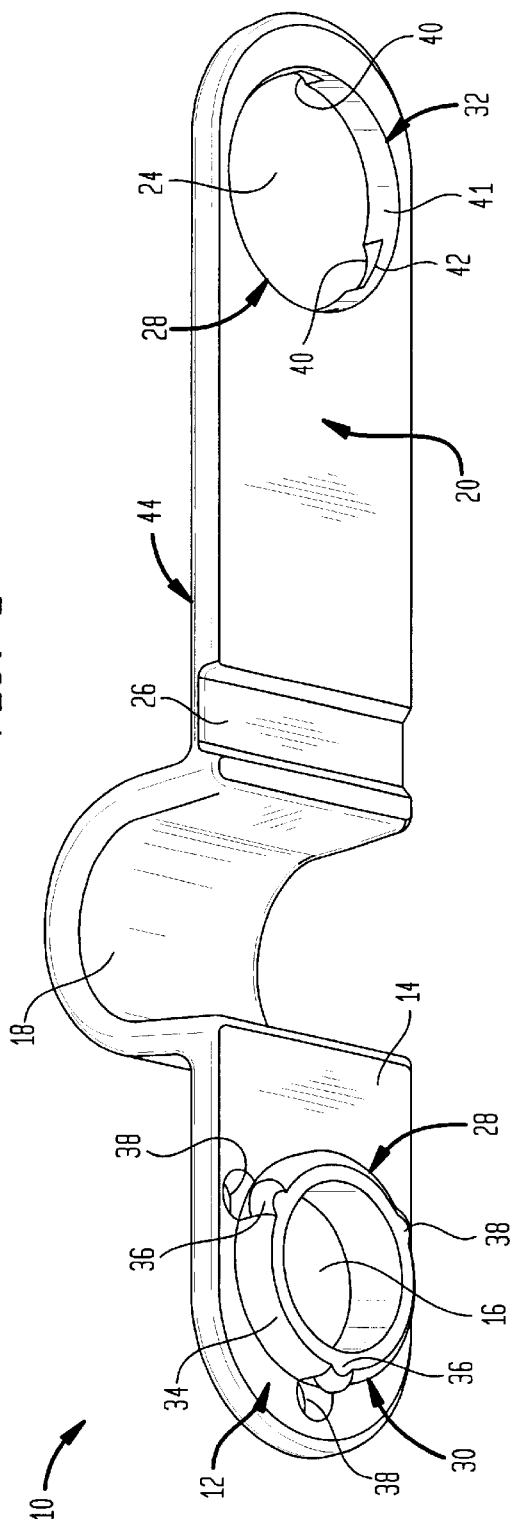
FIG. 1 is a bottom perspective view of a first embodiment of a cable clamp constructed in accordance with the present invention, shown in its open position.
Figure 3:
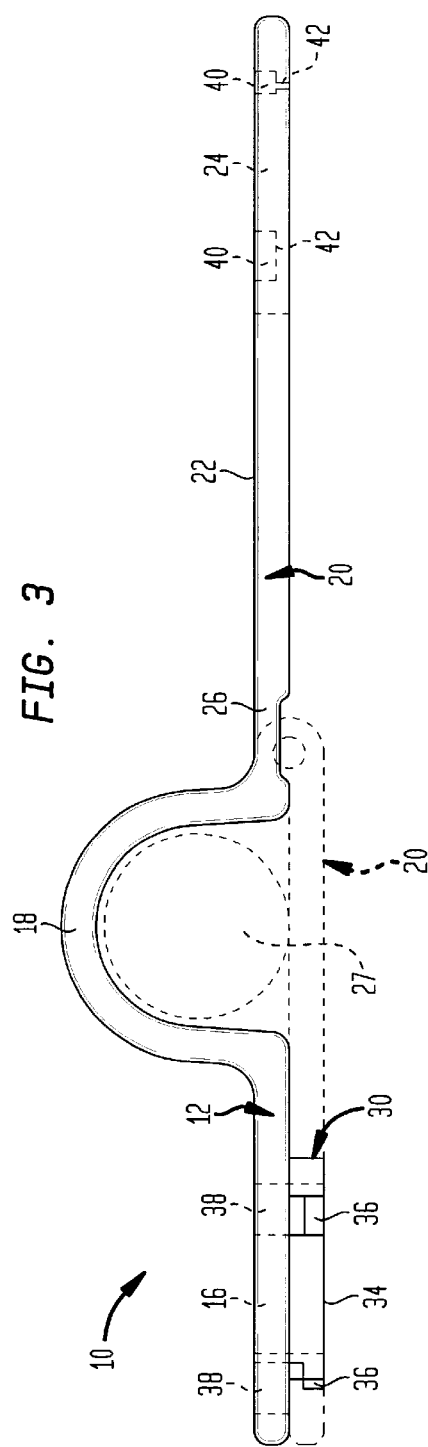
FIG. 3 is a front elevational view of the cable clamp shown in FIG. 1, with its closed position being indicated in phantom.
Figure 2:
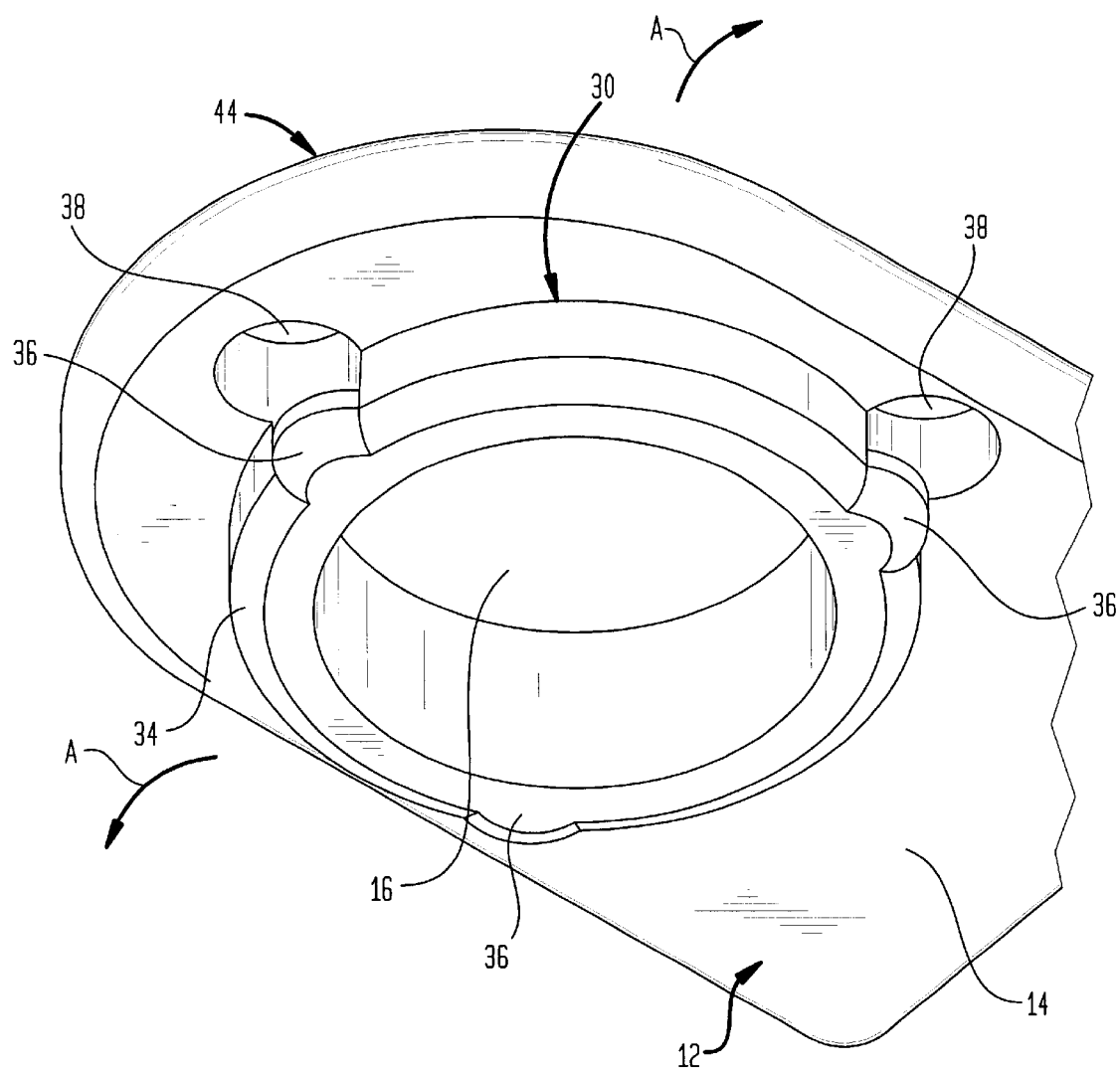
FIG. 2 is an enlarged view of a portion of the cable clamp shown in FIG. 1.
Figure 4:
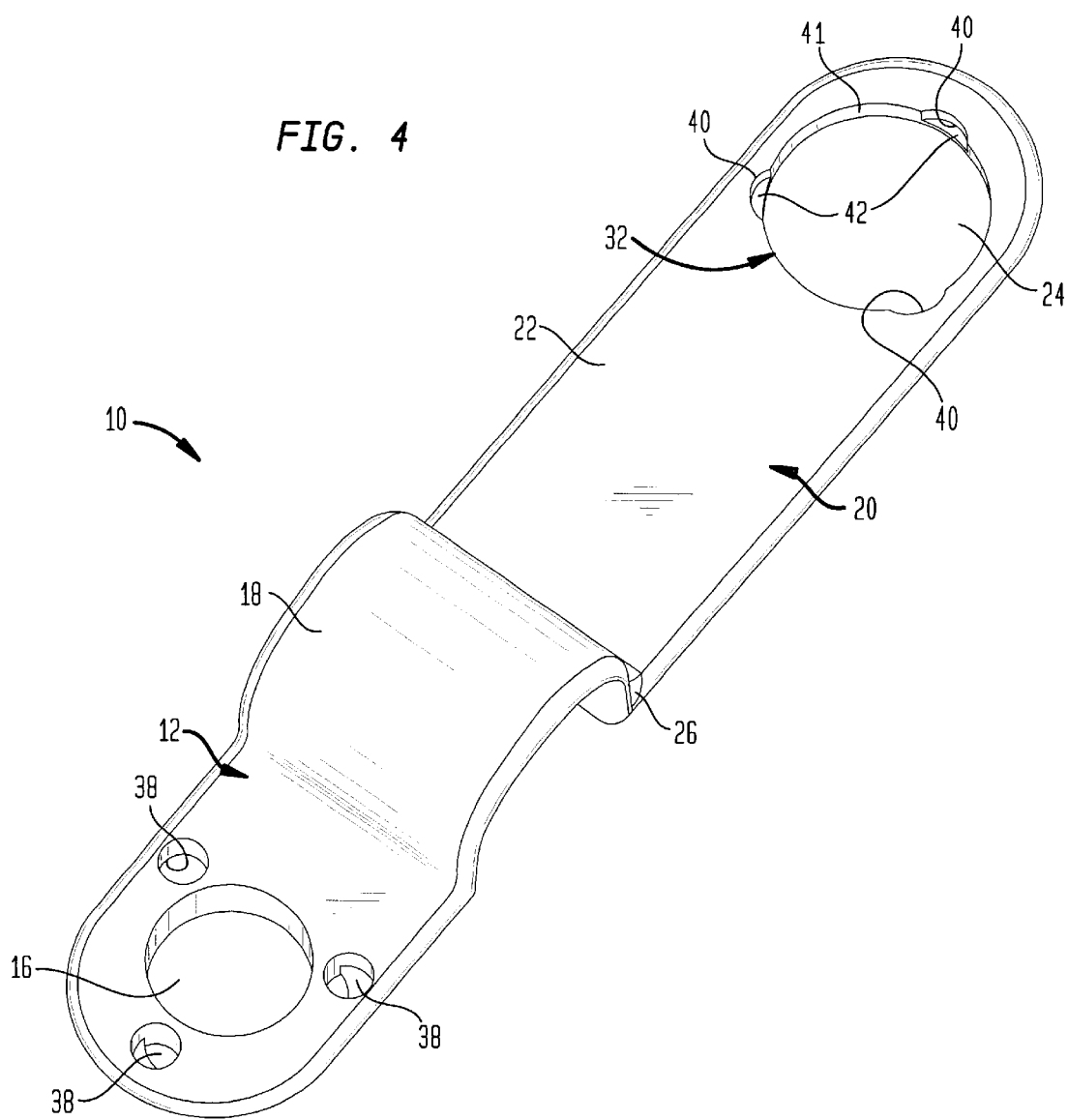
FIG. 4 is a top perspective view of the cable clamp shown in FIG. 1.
Figure 5:
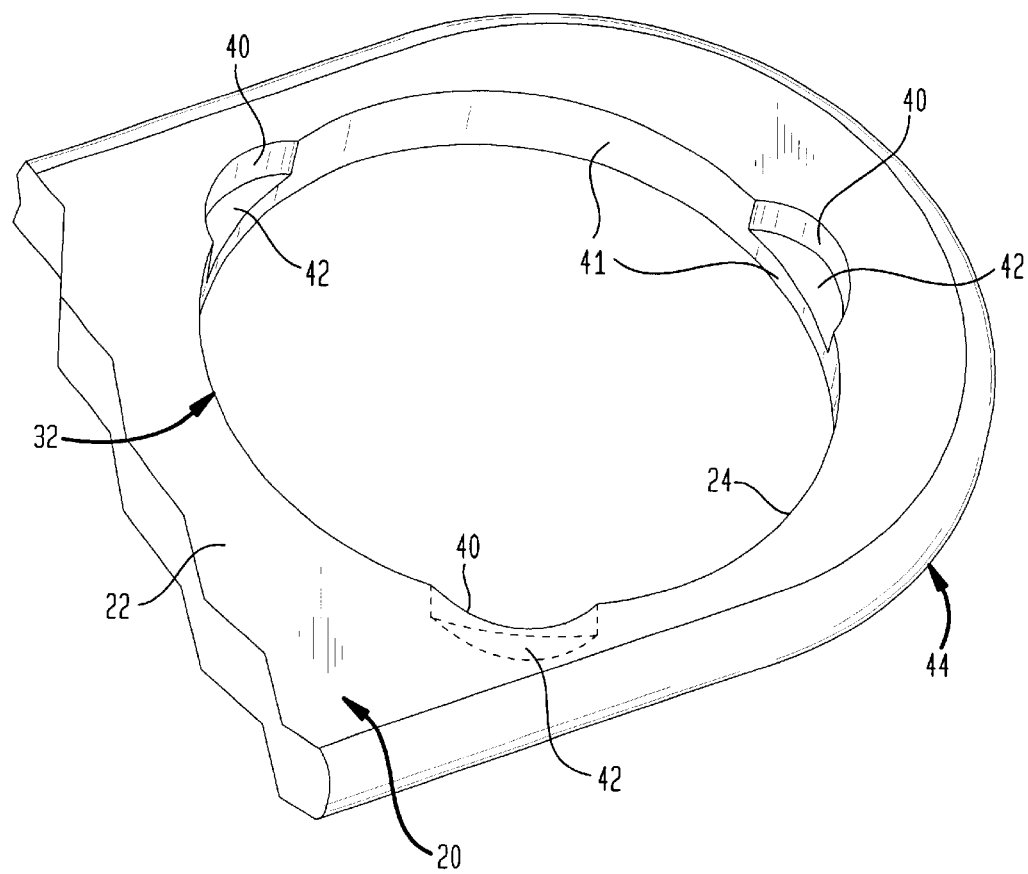
FIG. 5 is an enlarged view of a portion of the cable clamp shown in FIG. 4.

Referring to FIGS. 1–5, a cable clamp 10, preferably made of a flexible plastic, includes a short tab or leg 12 having a bottom side 14, a mounting hole 16, and a U-shaped trough 18. A long tab or leg 20 has a top side 22 and a mounting hole 24. The long leg 20 is attached to the short leg 12 by a living hinge 26. When the clamp 10 is pivoted at the living hinge 26 into its closed position (as shown in phantom in FIG. 3), the mounting holes 16, 24 align to permit a fastener, such as a screw, to be inserted therethrough. Additionally, when the clamp 10 is in its closed position, the U-shaped trough 18 will be closed at the open end of the "U" by the long leg 20, thereby securing a cable 27 (as shown in phantom in FIG. 3) within the U-shaped trough 18. When considered as a whole, the cable clamp 10 could be described generally as a strap.

The clamp 10 further includes a snap-ring mechanism 28 consisting of a male member 30 on the short leg 12 and a female member 32 on the long leg 20. The male member 30 has a ring 34 which projects from the bottom side 14 of the short leg 12. Three fingers 36, having generally an "L" shape (see FIG. 3) and curved edges (see FIG. 2), extend radially outward from the ring 34. Three overmold holes 38 are located above the fingers 36, each overmold hole 38 being aligned with a corresponding one of the fingers 36. The overmold holes are a consequence of the injection molding process wherein a pinshaped portion of an injection molding mold forms the surface of the fingers 36 corresponding to the lower leg of the "L" shape, i.e., to create a space between the lower leg of the "L" and the bottom side 14 of leg 12. Without the overmolding holes and pins, the spacing would have to be made by a subsequent machining step. The female member 32 has three notches 40 located in the top side 22 of the long leg 20 extending into an inner cylindrical surface 41 of the mounting hole 24. Each notch 40 extends partially through the long leg 20, thereby forming a crescent-shaped ledge 42 which projects radially outwardly from the inner surface 41.

The clamp 10 preferably has a radiused outer edge 44 to prevent damage to the cable 27. The radiused edge 44 is particularly important in the area of the U-shaped trough 18, since any stresses placed upon the cable 27 will occur while the clamp 10 is in its closed position, with the cable 27 being secured within the U-shaped trough 18.

The clamp 10 is put into its closed position as follows. The cable 27 is placed into the U-shaped trough 18, and the long leg 20 is moved towards the short leg 12 by folding the clamp 10 at the living hinge 26. The fingers 36 are deflected inward by the inner surface 41 until they pass over the ledges 42, when they return to their normal position and engage in the notches 40. The fingers 36 hook over the ledges 42 and fill the notches 40, thereby securing the fingers 36 in the notches 40. The interlocking arrangement of the fingers 36 and the notches 40 prevents lateral movement of the short leg 12 relative to the long leg 20 in the general direction of the arrows A shown in FIG. 2.

The shape of the fingers 36 can be modified from the "L" shape as shown in the Figures, provided that the fingers 36 are constructed such that they can be deflected by the inner surface 41 and hook over the ledges 42 and into the notches 40. If the shape of the fingers 36 is modified, it may also be necessary to alter the shape and/or depth of the notches 40, in order to accommodate the fingers 36. The relationship between the fingers 36 and the notches 40 is important, in that it ensures that the clamp 10 will remain in its closed position and not be inadvertently opened, as well as preventing the lateral movement described above. To secure the clamp 10 to a support surface, a fastener, such as a screw, is inserted through the mounting holes 16, 24 and is attached to the support surface.

Another exemplary embodiment of a cable clamp constructed in accordance with the present invention is illustrated in FIGS. 6–9. Elements shown in FIGS. 6–9 which correspond to elements described above with respect to FIGS. 1–5 have been designated by corresponding reference numerals increased by one hundred. The embodiment of FIGS. 6–9 is designed for use in the same manner as the embodiment of FIGS. 1–5 unless otherwise stated. This numbering convention does not apply to elements of environmental structure, such as the cable and the mounting surface.

Figure 6:
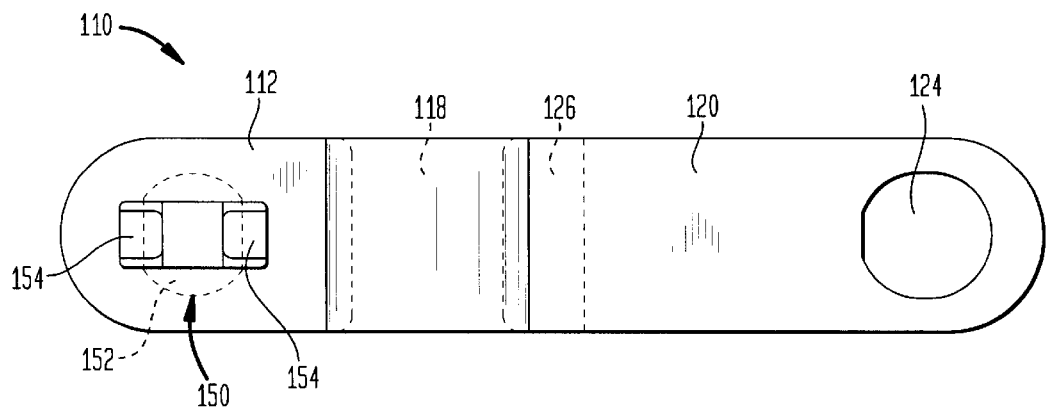
FIG. 6 is a top plan view of a second embodiment of a cable clamp constructed in accordance with the present invention, shown in its open position.
Figure 7:
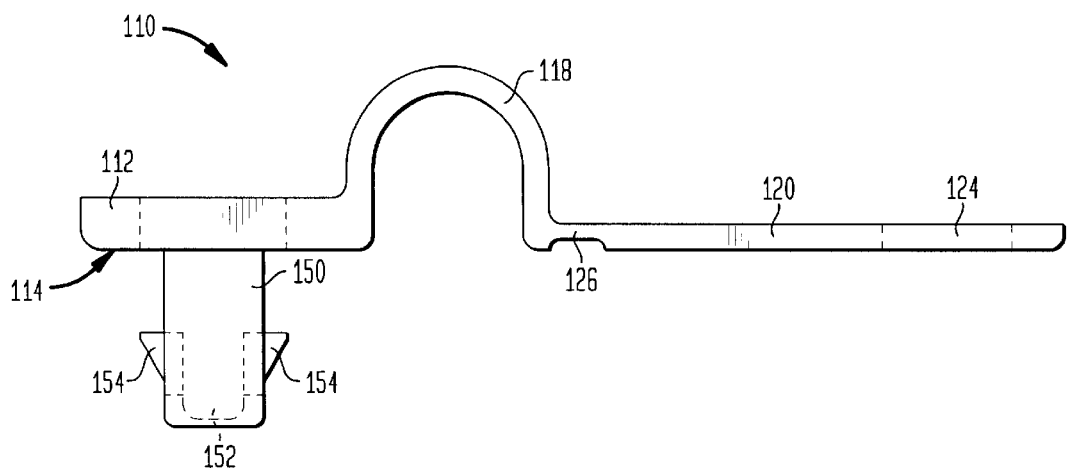
FIG. 7 is a front elevational view of the cable clamp shown in FIG. 6.

As shown in FIGS. 6 and 7, a cable clamp 110, preferably made of a flexible plastic, includes a short leg 112 having a bottom side 114 and a U-shaped trough 118. A long leg 120 having a mounting hole 124 is attached to the short leg 112 by a living hinge 126. A pin or post 150 having a hollow interior 152 depends from the bottom side 114 of the short leg 112. Two pivotable latching members 154 are located on opposite sides of the post 150. When in their normal position, the latching members 154 extend partially into the hollow interior 152 of the post 150. The latching members 154 are flexible enough such that they can completely fit within the hollow interior 152.

FIGS. 8 and 9 show a cable 160 secured in the clamp 110 in the process of being mounted onto a support surface 170. The cable 160 is first inserted into the U-shaped trough 118. The clamp 110 is then pivoted along the living hinge 126, bringing the long leg 120 into contact with the short leg 112, the long leg 120 closing off the open end of the U-shaped trough 118, thereby securing the clamp 110 around the cable 160.

As the post 150 passes through the mounting hole 124, the latching members 154 deflect inwardly, fully into the hollow interior 152 of the post 150. With the latching members 154 in this position, the post 150 is passed through an opening in the support surface 170 (see FIG. 8). Once the latching members 154 have passed completely through the mounting hole 124 and the support surface 170, the latching members 154 return to their normal position, thereby securing the short leg 112 to the long leg 120 and securing the clamp 110 to the support surface 170 (see FIG. 9). By using the post 150 and the latching members 154, no separate fastener is needed to attach the clamp 110 to the support surface 170.

It will be understood that the embodiments described herein are merely exemplary and that a person skilled in the art may make many variations and modifications without departing from the spirit and scope of the present invention. For example, the basic design of the clamps 10, 110 described herein can be dimensioned to accommodate any diameter of cable within the U-shaped trough 18, 118. Additionally, the male and female members 30, 32 of the snap-ring mechanism 28 can be located on either leg of the clamp 10. All such variations and modifications are intended to be included within the scope of the invention.

What is claimed is:

1. A clamp for holding elongated objects proximate to a mounting surface, comprising:

a generally U-shaped trough for receiving the object to be held;

a pair of substantially flat tabs extending from opposite sides of said trough proximate to an open end of said trough, a first of said pair of tabs being bendable to bridge over said trough and underlay a second of said pair of tabs in substantially parallel relationship thereto, thereby closing said open end of said trough, at least one of said first and second tabs having an opening therein for receiving a fastener to mount said clamp to the mounting surface;

alignment means for establishing and maintaining the position of said first tab relative to said second tab when said first tab underlays said second tab and closes said open end of said trough, said alignment means including a ring extending from a surface of one of said first and second tabs, said alignment means further including an aperture in the other of said first and second tabs, said aperture being sized and shaped to receive said ring therein when said first tab is underlayed beneath the second tab; and a hinge disposed intermediate a free end of said first tab and said trough, said hinge permitting said first tab to bend until it underlies said second tab to form a D-shape with said trough, the straight portion of said D-shape being proximate to the mounting surface with the curved portion of said D-shape extending away from the mounting surface with the curved portion of said D-shape extending away from the mounting surface when said clamp is attached thereto.

2. The clamp of claim 1, wherein said opening is within said ring.

3. The clamp of claim 2, wherein said ring has at least one prominence extending radially therefrom, said prominence clipping over an edge of said aperture when said ring is fully inserted into said aperture for retaining said ring within said aperture.

4. The clamp of claim 3, wherein the other of said first and second tabs has at least one relief disposed proximate to the periphery of said aperture for accommodating said at least one prominence therein to prevent said ring from turning relative to said aperture.

5. The clamp of claim 4, wherein said at least one prominence includes a plurality of prominences spaced at intervals around said ring and wherein said at least one relief includes a plurality of reliefs spaced at intervals around said aperture, each of said reliefs matingly receiving a corresponding one of said prominences when said ring is fully inserted into said aperture.

6. The clamp of claim 5, wherein said one tab has a plurality of overmolding bores extending therethrough for accommodating mold projections therein.

7. The clamp of claim 6, wherein a surface of each of said prominences which clips over said edge of said aperture is substantially parallel to and spaced from said surface of said one tab.

8. The clamp of claim 1, wherein said alignment means includes a fastener pin extending from a surface of said first tab, said fastener pin aligning with and projecting through said opening when said first tab underlies said second tab.

9. The clamp of claim 8, wherein said fastener pin has a length exceeding the thickness of said first tab such that it may interact with the mounting surface to hold said clamp in association therewith.

10. The clamp of claim 9, wherein said fastener pin has a resilient latch member extending therefrom, said latch member engaging the mounting surface.

11. The clamp of claim 10, wherein said resilient latch member is one of a pair of opposed latch members extending radially from said fastener pin such that when said fastener pin is inserted into an opening in the mounting surface, the latch members are compressed inwards until the fastener pin is fully inserted, at which point the latch members expand to engage an inner edge of the opening in the mounting surface.

12. The clamp of claim 1, wherein said tabs are substantially resistant to manual deformation other than at said hinge.

13. The clamp of claim 12, wherein said U-shaped trough is disposed at a selected distance relative to said opening.

14. The clamp of claim 1, wherein said alignment means includes for clamping said first and second tabs together in a closed position, in which said first tab underlays said second tab.

15. The clamp of claim 1, wherein said trough has radiused edges.

16. The clamp of claim 15, wherein the outer edges of said tabs are radiused.

* * * * *